US005662997A

United States Patent [19]

Onishi et al.

[11] Patent Number: 5,662,997

[45] Date of Patent: Sep. 2, 1997

[54] INK JET RECORDING FILM COMPRISING CATION-MODIFIED POLYVINYL ALCOHOL AND RECORDING METHOD USING THE SAME

[75] Inventors: Hiroyuki Onishi; Junichi Iida; Akio Owatari, all of Suwa, Japan

[73] Assignee: Seiko Epson Corporation, Tokyo-to, Japan

[21] Appl. No.: 446,217

[22] Filed: May 22, 1995

[30] Foreign Application Priority Data

May 23, 1994 [JP] Japan .................................... 6-108692

[51] Int. Cl.$^6$ ........................................................ B32B 5/16

[52] U.S. Cl. .................. 428/331; 106/31.58; 106/31.86; 347/100; 347/105; 428/334; 428/336; 428/518; 428/523

[58] Field of Search .................................... 428/331, 500, 428/518, 523, 334, 336; 346/135.1; 347/20, 100, 105; 106/20 R, 32, 20 D

[56] References Cited

U.S. PATENT DOCUMENTS

| | | | |
|---|---|---|---|
| Re. 34,933 | 5/1995 | Gager et al. | 428/246 |
| 4,636,805 | 1/1987 | Toganoh et al. | 346/1.1 |
| 4,801,497 | 1/1989 | Kono et al. | 428/332 |
| 5,068,140 | 11/1991 | Malhotra | 428/216 |
| 5,165,973 | 11/1992 | Kojima et al. | 428/331 |
| 5,270,103 | 12/1993 | Oliver et al. | 428/219 |
| 5,372,884 | 12/1994 | Abe et al. | 428/331 |

FOREIGN PATENT DOCUMENTS

| | | |
|---|---|---|
| 60-46289 | 3/1985 | Japan . |
| 62-134286 | 6/1987 | Japan . |

*Primary Examiner*—H. Thi Le

*Attorney, Agent, or Firm*—Ladas & Parry

[57] ABSTRACT

An ink jet recording film is provided which has well-balanced properties required of the ink jet recording film. The ink jet recording film comprises a transparent substrate, an anchor coat layer laminated on one side of the substrate, and an ink-receptive layer laminated on the anchor coat layer; wherein the ink-receptive layer comprises a polyvinyl alcohol having a degree of saponification of 80 to 95% and a degree of polymerization of 1,000 to 2,000.

18 Claims, No Drawings

INK JET RECORDING FILM COMPRISING CATION-MODIFIED POLYVINYL ALCOHOL AND RECORDING METHOD USING THE SAME

BACKGROUND OF THE INVENTION

1. Field of the Invention

The present invention relates to an ink jet recording film and an ink recording method using the same.

2. Background Art

Overhead projectors (OHP) are attractive as a presentation tool. When printing on a film for OHP is carried out by ink jet recording, the following properties are required of the film for OHP: (1) The drying and fixation rate are high in both a single color area and a mixed color area; (2) Neither feathering nor bleeding is observed in the print; (3) A dot diameter corresponding to a resolution is realized; (4) Good carriability is provided; (5) The film has an excellent storage stability before printing; for example, the film is free from a change in shape such as curling, blocking under the influence of temperature and humidity, and deterioration having an influence on print quality. The film also has an excellent storage stability after printing; for example, the film is free from a deterioration of print in quality with lapse of time. Various ink jet recording films have been proposed for satisfying the required properties.

For example, several ink jet recording films comprising a transparent substrate and, provided thereon, an ink-receptive layer composed mainly of a water-soluble or hydrophilic resin receptive to a water-base ink have been proposed in the art (for example, Japanese Patent Laid-Open No. 146786/1980).

Further, in order to improve the adhesion between an ink-receptive layer and a substrate a film having an anchor coat layer provided between them has been proposed (for example, Japanese Patent Laid-Open Nos. 46289/1985, 13285/1987, and 134286/1987).

Furthermore, a film wherein the ink-receptive layer has a structure of two or more layers in order to improve drying and fixing properties of prints has been proposed (for example, Japanese Patent Laid-Open Nos. 224578/1985 and 115779/1988).

Furthermore, a film having an anti-curling layer has been proposed in order to improve the carriability and, at the same time, to prevent curling of the film (for example, Japanese Patent Laid-Open Nos. 235184/1986, 233283/1987, 114874/1991, and 96843/199).

However, there is room for improvement in the above films, and a need still exits for a better ink jet recording film.

SUMMARY OF THE INVENTION

We have now found that an excellent ink jet recording film can be obtained with an ink-receptive layer having a particular composition.

Accordingly, an object of the present invention is to provide an ink jet recording film which can satisfy, in a well-balanced manner, properties required of an ink jet recording film.

According to the present invention, there provides an ink jet recording film comprising:

a transparent substrate, an anchor coat layer formed on one side of the substrate, and an ink-receptive layer formed on the anchor coat layer, wherein the ink-receptive layer comprises a polyvinyl alcohol having a degree of saponification of 80 to 95% by mole and a degree of polymerization of 1,000 to 2,000 .

DETAILED DESCRIPTION OF THE INVENTION

The ink-receptive layer of the ink jet recording film according to the present invention comprises a polyvinyl alcohol. The polyvinyl alcohol has a degree of saponification of 80 to 95%, by mole preferably 85 to 90%, and a degree of polymerization of 1000 to 2000, preferably 1300 to 1800. Good printing properties can be provided when the degree of saponification and the degree of polymerization are in the respective ranges. In particular, the degree of saponification in the range can provide especially good drying and coloring properties and, at the same time, a print free from feathering or bleeding. Meanwhile, the degree of polymerization in the above range offers an advantage that not only good printing properties but also good formability at the time of production thereof can be provided.

Further, according to a preferred embodiment of the present invention, the polyvinyl alcohol may be modified by adding a cation thereto. When the ink-receptive layer comprises a modified polyvinyl alcohol with a cation added thereto, the feathering or bleeding can be effectively inhibited even in the case of printing using an ink composition having a relatively high content of water soluble organic solvent. In addition, the use of the modified polyvinyl alcohol with a cation added thereto improves the fixation of the print and, further, improves the storage stability of the print.

According to another preferred embodiment of the present invention, the modified polyvinyl alcohol with a cation added thereto is still preferably used in the form of a mixture with a polyvinyl alcohol to which no cation has been added. The use of the mixture can further improve the fixation of the print and the storage stability of the print. Regarding the mixing proportion, the weight ratio of the polyvinyl alcohol with no cation being added thereto to the modified polyvinyl alcohol with a cation added thereto is about 1:0.5 to 1.5, preferably about 1:0.8 to 1.2.

Specific preferred examples of the polyvinyl alcohol used in the present invention include Gosenol (manufactured by Nippon Synthetic Chemical Industry Co., Ltd.) and Poval (manufactured by Kuraray Co., Ltd.).

In the final ink-receptive layer, the amount of the polyvinyl alcohol added is preferably about 5 to 20% by weight, still preferably about 8 to 15% by weight. The ink-receptive layer may contain a different water-soluble resin in such an amount as will not sacrifice the effect attained by the addition of the polyvinyl alcohol. Specific preferred examples of the different water-soluble resin include water-soluble vinyl polymer resins, such as polyvinyl pyrrolidone; polyacrylic polymer resins; water-soluble cellulosic polymer resins, such as methyl cellulose, ethyl cellulose, carboxymethyl cellulose, and hydroxyethyl cellulose; and synthetic water-soluble polymer resins, such as polyethylene oxide, polyethylene-imine, and polyurethane.

According to a preferred embodiment of the present invention, the ink-receptive layer may further comprise colloidal silica. The colloidal silica serves to improve the wettability of the ink-receptive layer by an ink by virtue of the presence of SiOH group of the colloidal silica per se and absorbed water without lowering the circularity of recorded dots. This facilitates the regulation of dot diameter and effectively inhibits blocking. Further, the addition of the colloidal silica can offer a further advantage that an antistatic property can be imparted to the ink-receptive layer.

According to a preferred embodiment of the present invention, the average particle diameter of the colloidal silica is 1 to 100 nm, still preferably about 10 to 30 nm.

The amount of the colloidal silica added is, on a solid basis, about 5 to 15% by weight, still preferably 8 to 13% by weight, based on the ink-receptive layer on a solid basis.

Preferred examples of the colloidal silica include Snowtex (manufactured by Nissan Chemical Industry Ltd.) and Aerosil (manufactured by Nippon Aerosil Co., Ltd.).

According to a preferred embodiment of the present invention, in order to improve the anti-blocking property, the ink-receptive layer preferably contains an inorganic powder, such as kaolin, talc, calcium sulfate, barium sulfate, calcium silicate, magnesium silicate, magnesium hydroxide, silica, alumina, calcium carbonate, and aluminum hydroxide; or a plastic pigment, such as silicone, polyethylene, polystyrene, or acrylic resin. The ink-receptive layer most preferably contains crosslinking organic fine particles. The presence of the fine particles is advantageous because the anti-blocking property can be enhanced without lowering the transparency of the film. Preferably, the organic fine particles have a sharp particle size distribution and an average particle diameter of about 5 to 20 μm. The crosslinking organic fine particles preferably comprise a physically or chemically crosslinked polymer. Preferred examples of the crosslinking fine particles include Techpolymer (manufactured by Sekisui Plastic Co., Ltd.), Finepearl (manufactured By Sumitomo Chemical Co., Ltd).

According to a preferred embodiment of the present invention, the ink-receptive layer preferably comprises a waterproofing agent, such as melamine resin, urea, or phenolic resin, in order to improve the water resistance. Particularly preferred waterproofing agents include trimethylol melamine, dimethylol urea, and modified polyamide resin. The amount of the waterproofing agent added is about 5 to 10% by weight based on the polyvinyl alcohol.

In order to improve the smoothness (levelling) of the ink-receptive layer in the production of an ink-receptive layer, a surfactant may be incorporated into the ink-receptive layer. Preferably, the surfactant has a low HLB. Preferred surfactants include fluorosurfactants and fluoro-silicone surfactants. The fluorosurfactants include Lodyne (manufactured by Ciba-Geigy), Zonyl (manufactured by Du Pont), and Monflor (manufactured by ICI). An ethylene oxide adduct of a perfluoroalkyl-modified silicone (manufactured by Shin-Etsu Silicone Co., Ltd.) may be used as the fluoro-silicone surfactant.

Further, the ink-receptive layer of the ink jet recording film according to the present invention may contain a pH adjustor, a preservative, a mildewproofing agent, a viscosity modifier, an anti-foaming agent, and penetrating agent.

According to a preferred embodiment of the present invention, the thickness of the ink-receptive layer is preferably In the range of from about 3 to 20 μm, still preferably about 5 to 15 μm.

The transparent substrate for use in the ink jet recording film according to the present invention is preferably a polyester film having excellent transparency and mechanical strength. Particularly preferred is biaxially stretched polyethylene terephthalate film at least one side of which has been subjected to corona treatment from the viewpoint of forming a uniform coating and improving the adhesion between the coating and the substrate. The thickness of the substrate is preferably about 50 to 200 μm, still preferably 75 to 125 μm.

According to a preferred embodiment of the present invention, the ink jet recording film comprises an anchor coat layer between the transparent substrate and the ink-receptive layer. The anchor coat layer improves the adhesion between the ink-receptive layer and the transparent substrate and to prevent the lowering of the adhesion between the ink-receptive layer and the transparent substrate even when the ink-receptive layer has absorbed a water-base ink. Further, for color recording, the anchor coat layer accelerates drying and fixation time of the ink as an ink-receptive layer, preventing the occurrence of color bleeding in the case of a color mixture and feathering. The thickness of the anchor coat layer is preferably in the range of from about 1 to 15 μm, still preferably from about 2 to 10 μm.

Preferably, the anchor coat layer has a combination of an adhesion to the transparent substrate with good ink absorption and ink fixation. A material usable for constituting the anchor coat layer is preferably a water-soluble resin, still preferably an acrylic resin. The acrylic resin prevents color bleeding in the case of a color mixture and increase in thickness of letters, accelerates the drying and fixation time and, at the same time, improves the fixation of an ink after printing (i.e., preventing the ink from being transferred even when paper is put on a print). Preferred examples of the acrylic resin include a copolymer of a monomer, such as an alkyl alkylate, an alkyl methacrylate, or 2-hydroxyethyl methacrylate, and a mixture of a copolymer of a methyl chloride salt of N,N-dimethylaminoethyl methacrylate with a diglycidyl ether compound.

According to a preferred embodiment of the present invention, the ink jet recording film according to the present invention further comprises an anti-curling layer on the back of the substrate having the ink-receptive layer. Since the ink-receptive layer is formed of a hydrophilic resin as described above, it often absorbs water in the air and swells in an environment of high relative humidity (for example, a relative humidity of about 80%), causing curving. On the other hand, in an environment of low relative humidity (for example, a relative humidity of about 20%), water contained in the ink-receptive layer is released to cause shrinking, which in turn causes curving in a direction opposite to that described above. The provision of the anti-curling layer is effective in preventing such an unfavorable phenomenon. Preferred examples of materials for the anti-curling layer usable in combination with the above ink-receptive layer according to the present invention include polyester resins and acrylic resins. A specific example of the anti-curling layer is one formed of an acrylic main agent (Acrydic, manufactured by Dainippon Ink and Chemicals, Inc.) in combination with a curing agent (Burnock, manufactured by Dainippon Ink and Chemicals, Inc.).

The inorganic or organic powder which can improve the anti-blocking property may be added to the anti-curling layer from the viewpoint of adjusting the coefficient of friction of the film.

The thickness of the anti-curling layer is preferably not more than 20 μm from the viewpoint of the transparency and the productivity. Still preferably, the thickness of the anti-curling layer is 1 to 15 μm with the thickness of the ink-receptive layer being 3 to 20 μm.

Further, in the present invention, in order to prevent double feed which occurs due to adhesion between films caused by generation of static electricity in an environment of low humidity, it is preferred to add an antistatic agent to the ink-receptive layer and/or the anti-curling layer. The antistatic agent is preferably an antistatic surfactant.

Examples thereof include alkylbenzene sulfonates, polyoxyethylene alkyl ethers and phosphate esters thereof and salts thereof, fatty acid monoglycerides, and partial esters of fatty acid sorbitan.

When the ink-receptive layer or anti-curling layer containing an antistatic agent has a surface resistivity of not more than $1\times10^{15}$ Ω as measured in an environment of relative humidity 20 to 80%, the adhesion between films by static electricity can be prevented to surely prevent double feed. By virtue of this, in an ink jet printer using an automatic feeder, films can be surely separated one by one under a wide range of temperature and humidity conditions by bringing the film into press contact with a feeding roller and rotating the feeding roller, enabling continuous printing with high reliability.

The ink jet recording film according to the present invention can be prepared as follows. Specifically, it can be prepared by dissolving components respectively for the ink-receptive layer, anchor coat layer, and anti-curling layer in water or a suitable solvent to prepare coating solutions and coating the coating solutions by a roll coater, a blade coater, or a bar coater.

Printing on the ink jet recording film according to the present invention is carried out by ink jet recording. An ink composition basically comprising a colorant, water, and an organic solvent can be utilized for printing. Water is preferably ion-exchanged water of which the Ca ion and Mg ion contents have been reduced to not more than 5 ppm. Preferred examples of the organic solvent include high-boiling, low-volatile polyhydric alcohols, such as glycerin, ethylene Glycol, triethylene glycol, propylene glycol, dipropylene Glycol, hexylene glycol, polyethylene glycol, polypropylene glycol, 1,3-propanediol, and 1,5-pentanediol. Further preferred examples thereof include lower alkyl ethers of polyhydric alcohols, such as diethylene glycol monobutyl ether and triethylene glycol monobutyl ether; and nitrogen-containing organic solvent, such as N-methyl-2-pyrrolidone, 1,3-dimethyl-2-imidazolidinone, monoethanolamine, diethanolamine, and triethanolamine are preferably used. Additives which are solid and highly hygroscopic, such as urea and saccharides, may be added from the viewpoint of preventing clogging of nozzles.

According to a preferred embodiment of the present invention, the feathering and bleeding can be effectively prevented when the amount of the polyhydric alcohol and the lower alkyl ether of a polyhydric alcohol added is about 4 to 30% by weight. The amount thereof is still preferably 7 to 20% by weight.

EXAMPLES

The present invention will now be described in more detail with reference to the following examples, though it is not limited to these examples only.

Example 1

A coating solution composed mainly of an acrylic polymer (Hiresin (trial product), manufactured by Takamatsu oil & fat Co., Ltd.; solid content 17 parts by weight) was coated on a 100 μm-thick polyethylene terephthalate film by means of an applicator and dried in a constant temperature drier at 100° C. for 2 min to form a 3 μm-thick anchor coat layer.

A coating solution comprising 10 parts by weight of polyvinyl alcohol (Poval PVA217, manufactured by Kuraray Co., Ltd.: degree of saponification 88% by mole, degree of polymerization 1700), 0.5 part by weight of a waterproofing agent (Sumirez 5004, manufactured by Sumitomo Chemical Co., Ltd.; solid content 45% by weight), 10 parts by weight of colloidal silica (Snowtex ST-30, manufactured by Nissan Chemical Industry Ltd.; solid content 30% by weight), 0.2 part by weight of crosslinked polystyrene beads (Techpolymer, manufactured by Sekisui Plastic Co., Ltd.), 0.5 part by weight of a leveling agent (TK wetting agent, manufactured by Takamatsu oil a fat Co., Ltd.), and 88.8 parts by weight of ion-exchanged water was coated by means of an applicator on the anchor coat layer. Thereafter, the coated film was dried ink a constant temperature drier at 110° C. for 3 min to provide a transparent film having a 10 μm-thick ink-receptive layer (total coating thickness:13 μm).

Further, a two-pack curing type coating solution of an acrylic polyol type (main agent: 100 parts by weight of Acrydic manufactured by Dainippon Ink and Chemicals, Inc., curing agent: 8 parts by weight of Burnock manufactured by Dainippon Ink and Chemicals, Inc.) was coated by means of a bar coater, and the resultant coating was dried in a constant temperature drier at 100°C. for 1 min to form a 7 μm-thick-anti-curling layer.

Comparative Example 1

An ink jet recording film was prepared in the same manner as in Example 1, except that PVA 117 manufactured by Kuraray Co., Ltd. (degree of saponification: 98.5% by mole, degree of polymerization: 1700) was used instead of the polyvinyl alcohol of Example 1.

Comparative Example 2

An ink jet recording film was prepared in the same manner as in Example 1, except that KM-11 manufactured by Nippon Synthetic Chemical Industry Co., Ltd. (degree of saponification: 80% by mole, degree of polymerization: changed from 1000 to 1500) was used instead of the polyvinyl alcohol of Example 1.

Comparative Example 3

An ink jet recording film was prepared in the same manner as in Example 1, except that polyvinyl alcohol Poval PVA205 manufactured by Kuraray Co., Ltd. (degree of saponification: 88% by mole, degree of polymerization: 300 to 700) was used instead of the polyvinyl alcohol of Example 1.

Comparative Example 4

An ink jet recording film was prepared in the same manner as in Example 1, except that polyvinyl alcohol Poval PVAL-8, manufactured by Kuraray Co., Ltd. (degree of saponification: 71% by mole, degree of polymerization: 700) was used instead of the polyvinyl alcohol of Example 1.

Preparation of Ink Compositions

The following ink compositions were prepared by a conventional method.

| Yellow ink | |
|---|---|
| C.I. Direct Yellow 86 | 2% by weight |
| Glycerin | 10% by weight |
| Diethylene glycol monobutyl ether | 10% by weight |
| Ion-exchanged water | 78% by weight |

-continued

| | |
|---|---|
| Magenta ink | |
| C.I. Acid Red 52 | 2% by weight |
| Glycerin | 10% by weight |
| Diethylene glycol monobutyl ether | 10% by weight |
| Ion-exchanged water | 78% by weight |
| Cyan ink | |
| C.I. Direct Blue 199 | 2% by weight |
| Glycerin | 10% by weight |
| Diethylene glycol monobutyl ether | 10% by weight |
| Ion-exchanged water | 78% by weight |
| Black Ink | |
| C.I. Direct Black 19 | 3% by weight |
| Glycerin | 10% by weight |
| Diethylene glycol monobutyl ether | 10% by weight |
| Ion-exchanged water | 78% by weight |

Ink jet recording was carried out on the ink jet recording films prepared in Example 1 and Comparative Examples 1 and 2 using the above ink compositions with Ink Jet printer MJ-700V2C manufactured by Seiko Epson Co., Ltd. which is a recording device provided with an on-demand type ink jet recording head, which projects an ink by taking advantage of a piezoelectric oscillator, and an automatic feeder.

The results were evaluated as follows.

Evaluation 1: Recording Properties (1) Dot Diameter

A photomicrograph (magnification: 100 times) of the print was scaled. Dot diameters are evaluated as follows:

Dot diameter is corresponding to a resolution—○,

Dot diameter not corresponding to a resolution (larger or smaller than the resolution)—X.

(2) Feathering

A black letter was printed on yellow. Irregular feathering is:

observed—X, and not observed—○.

(3) Bleeding in the Interface

Printing was carried out so that solid prints of red and green come into contact with each other. In the interface of read and green, the bleeding is observed—X, and not observed—○.

(4) Drying Property

The solid red print portion was rubbed with a finger to measure the time taken for the finger not to be stained with the ink anymore. After the print, the time is:

not more than 1 min.—○, and more than 1 min.—X.

(5) Fixation 10 min after printing of solid red print portion, paper was put on top of that portion. The print transferred to the paper is:

observed—X, and not observed—○.

Evaluation 2: Anti-Blocking Property

Two films were put on top of the other film under an environment of temperature 40° C. and humidity 80%. A load of 500 g was applied to the resultant laminate which was then allowed to stand in this state for one month. After standing, the state of the two films was observed. The two films:

adhered to each other—X, and not adhered to each other—○.

Evaluation 3: Curling Resistance

The film was allowed to stand with the print face facing upward under an environment of temperature 10° C. and humidity 20% and under an environment of temperature 32° C. and humidity 80% for 3 hr. Curling was:

observed—X, and not observed—○.

The results of evaluation were as given in the following Table 1.

TABLE 1

| Evaluation | | Ex. 1 | Comp. Ex. 1 | Comp. Ex. 1 | Comp. Ex. 3 | Comp. Ex. 4 |
|---|---|---|---|---|---|---|
| (1) Recording properties | 1. Dot diameter | ○ | ○ | ○ | ○ | X |
| | 2. Feather- | ○ | X | X | X | X |
| | 3. Bleeding at boundary | ○ | X | X | X | X |
| | 4. Drying property | ○ | X | X | X | X |
| | 5. Fixation | ○ | X | X | X | X |
| (2) Anti-blocking property | | ○ | ○ | ○ | X | X |
| (3) Curling resistance | 10° C., 20% | ○ | ○ | ○ | ○ | ○ |
| | 32° C., 80% | ○ | ○ | ○ | ○ | ○ |

Example 2

An ink jet recording film was prepared in the same manner as in Example 1, except that a coating solution comprising 0.5 part by weight of an antistatic surfactant (Electro Striper PC, manufactured by Kao Corp.) and 0.5 part by weight of a compatiblizing agent (Pelex OT-P, manufactured by Kao Corp.) was used to prepare the anti-curling layer.

This ink jet recording film was evaluated for (4) carriability and (5) surface resistivity as follows.

Evaluation 4: Carriability (1) Evaluation Under Low Temperature and Low Humidity Conditions 50 films were continuously fed under an environment of temperature 10° C. and humidity 20%.

At least one film caused one or more of double feed, non—feed and failure of . . . was observed—X.

None of the films caused double feed, non—feed and failure of . . . was observed—○.

(2) Evaluation Under High Temperature and High Humidity Conditions 50 films were continuously fed under an environment of temperature 32° and humidity 80%. As the results, double feed or non—feed of the film or failure of feeding the film in a correct way was observed—X, and double feed or non—feed of the film and failure of feeding the film in a correct way were not observed—○.

Evaluation 5: Surface Resistivity

Both sides of the films were subjected to measurement of surface resistivity with a surface resistivity measuring device. The surface resistivity is:

more than $1\times10^{15}$ Ω—X, and less than $1\times10^{15}$ Ω—○.

The evaluation results were as given in the following Table 2.

TABLE 2

| Evaluation | | Ex. 2 |
|---|---|---|
| (4) Carriability | (4) -1 10° C., 20% | O |
| | (4) -2 32° C., 80% | O |
| (5) Surface resistivity | | O |

Example 3

An ink jet recording film was prepared in the same manner as in Example 1, except that a 1:1 mixture of Poval PVA 217 manufactured by Kuraray Co., Ltd. (degree of saponification: 88% by mole, degree of polymerization: 1700) and Gohsefimer K-210 manufactured by Nippon Synthetic Chemical Industry Co., Ltd. (degree of saponification: 87% by mole, a modified polyvinyl alcohol with a cation being added thereto) was used instead of the polyvinyl alcohol of Example 1.

The storage stability of the ink jet recording films prepared in Example 3 was evaluated as follows.

Evaluation 6: Storage Stability

A sample was prepared wherein a black letter was printed on yellow, and, further, solid prints (100% duty) of red and green were printed so as to contact with the letter. After printing, this sample was allowed to stand for 10 min, placed in a transparent file, and allowed to stand at room temperature for one weak. After that, the state of the sample was observed. As the results:

the print portion adhered to the file—X, and the print portion did not adhere to the file—O.

Further, the ink compositions prepared above were placed in an ink cartridge of Ink Jet printer MJ-700V2c and allowed to stand at 40° C. for one month. Thereafter, in all the ink compositions the total concentration of Glycerin and Diethylene glycol monobutyl ether increased from 20% by weight to 28% by weight due to the evaporation of water. Ink jet recording was carried out on the film prepared in Example 3 according to Evaluation 1 described above.

The results were as given in the following Table 3.

TABLE 3

| Evaluation | | Ex. 3 |
|---|---|---|
| (1) Recording characteristics | 1. Dot diameter | O |
| | 2. Feathering | O |
| | 3. Bleeding at boundary | O |
| | 4. Drying property | O |
| | 5. Fixation | O |
| (6) Storage stability | | O |

What is claimed is:

1. An ink jet recording film, comprising:

a transparent substrate, an anchor coat layer formed on one side of the substrate, and an ink-receptive layer laminated on the anchor coat layer, wherein the ink-receptive layer comprises a mixture of two or more types of polyvinyl alcohols, including a cation-modified polyvinyl alcohol and a non-cation modified polyvinyl alcohol, and wherein the polyvinyl alcohols have a degree of saponification of 80 to 95% by mole and a degree of polymerization of 1,000 to 2,000.

2. The ink jet recording film according to claim 1, wherein the ink-receptive layer further comprises a colloidal silica.

3. The ink jet recording film according to claim 2, wherein the colloidal silica is contained in an amount of 5 to 15% by weight on a solid basis based on the ink-receptive layer on a solid basis.

4. The ink jet recording film according to claim 1, wherein the anchor coat layer comprises an acrylic polymer.

5. The ink jet recording film according to claim 1, wherein the anchor coat layer has a thickness of 1 to 15 μm and the ink-receptive layer has a thickness of 3 to 20 μm.

6. The ink jet recording film according to claim 1, wherein an anti-curling layer is provided on the transparent substrate having the ink-receptive layer to prevent curling of the film.

7. The ink jet recording film according to claim 6, wherein the ink-receptive layer and/or the anti-curling layer further comprise an antistatic agent.

8. The ink jet recording film according to claim 6, wherein the ink-receptive layer end/or the anti-curling layer have a surface resistivity of not more than $1\times10^{15}$ Ω as measured in an environment of a relative humidity of 20 to 80%.

9. In an ink jet recording method comprising the step of ejecting ink droplets of an ink composition onto a recording medium, wherein the ink composition comprises a colorant, water and an organic solvent, the improvement wherein the recording medium is an ink jet recording film according to claim 1.

10. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol, and wherein the recording medium is an ink jet recording film according to claim 1.

11. An ink jet recording method according to claim 10 wherein the high-boiling and low-volatile polyhydric alcohol is selected from the group consisting of glycerin, ethylene glycol, triethylene glycol, propylene glycol, dipropylene glycol, hexylene glycol, polyethylene glycol, polypropylene glycol, 1,3-propanediol, and 1,5-pentanediol and the lower alkyl ether of a polyhydric alcohol is selected from the group consisting of diethylene glycol monobutyl ether, triethylene glycol monobutyl ether, N-methyl-2-pyrrolidone, 1,3dimethyl-2-imidazolidinone, monoethanolamine, diethanolamine, and triethanolamine.

12. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol, and wherein the recording medium is an ink jet recording film according to claim 2.

13. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol, and wherein the recording medium is an ink jet recording film according to claim 3.

14. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol and wherein the recording medium is an ink jet recording film according to claim 4.

15. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol, and wherein the recording medium is an ink jet recording film according to claim 5.

16. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol, and wherein the recording medium is an ink jet recording film according to claim 6.

17. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol, and wherein the recording medium is an ink jet recording film according to claim 7.

18. In an ink jet recording method comprising the step of ejecting ink droplets of an ink composition onto a recording medium, wherein the ink composition comprises a high-boiling and low-volatile polyhydric alcohol and/or a lower alkyl ether of a polyhydric alcohol, the improvement wherein the ink composition comprises not more than 30% by weight of the high-boiling and low-volatile polyhydric alcohol and/or the lower alkyl ether of a polyhydric alcohol, and wherein the recording medium is an ink jet recording film according to claim 8.

* * * * *